United States Patent

Yoshida et al.

[11] Patent Number: 5,223,990
[45] Date of Patent: Jun. 29, 1993

[54] DATA RECORDING APPARATUS

[75] Inventors: Teruyuki Yoshida; Keiko Kanetsuka; Hideki Arai, all of Kanagawa, Japan

[73] Assignee: Sony Corporation, Tokyo, Japan

[21] Appl. No.: 722,150

[22] Filed: Jun. 27, 1991

[30] Foreign Application Priority Data

Jun. 30, 1990 [JP] Japan .................. 2-174225

[51] Int. Cl.$^5$ .................... G11B 5/035
[52] U.S. Cl. ........................ 360/65; 360/39
[58] Field of Search ............ 333/30, 39, 46, 65

[56] References Cited

U.S. PATENT DOCUMENTS

| 4,479,152 | 10/1984 | Chi | 360/46 |
| 4,517,610 | 5/1985 | Minuhin | 360/46 X |
| 4,920,461 | 4/1990 | Eiberger | 360/68 |

FOREIGN PATENT DOCUMENTS

3800827A1 7/1989 Fed. Rep. of Germany .

OTHER PUBLICATIONS

Patent Abstracts of Japan vol. 12, No. 473 (P-799)(3320) Dec. 12, 1988 & JP-A-63 191 374 (Sanyo Electric Co., Ltd.) Aug. 8, 1988.
Patent Abstracts of Japan vol. 14, No. 267 (P-1058) (4210) Jun. 8, 1990 & JP-A-27 3 567 (Sony Corp) Mar. 13, 1990.
Patent Abstracts of Japan vol. 10, No. 19 (P-423) (2076) Jan. 24, 1986 & UP-A-60 171 661 (Hitachi Seisakusho K.K.) Sep. 5, 1985.
Patent Abstracts of Japan vol. 11, No. 100 (P-561) (2547) Mar. 28, 1987 & JP-A-61 250 873 (Sony Corp) Nov. 7, 1986.

*Primary Examiner*—Paul Gensler
*Attorney, Agent, or Firm*—William S. Frommer; Alvin Sinderbrand

[57] ABSTRACT

In a data recording apparatus, the data rate of an incoming information signal is used to select the frequency processing, such as band limiting or high frequency emphasizing, performed on the information signal to alter its frequency characteristic so that the information signal can be digitally recorded with magnetized patterns that are substantially similar even when recording at different recording speeds.

5 Claims, 6 Drawing Sheets

DATA RECORDING APPARATUS

BACKGROUND OF THE INVENTION

The present invention relates to a data recording apparatus, and is particularly suitably applied to a data recording apparatus which is capable of recording information data at different recording speeds.

There is known a data recording system which is capable of high density recording of information data using a helical scanning digital video tape recorder.

The maximum recording speed of such a data recording system depends on the maximum frequency of the high frequency band of the recording system, which includes a record amplification circuit, a rotary transformer and a rotary head.

Figure 1:
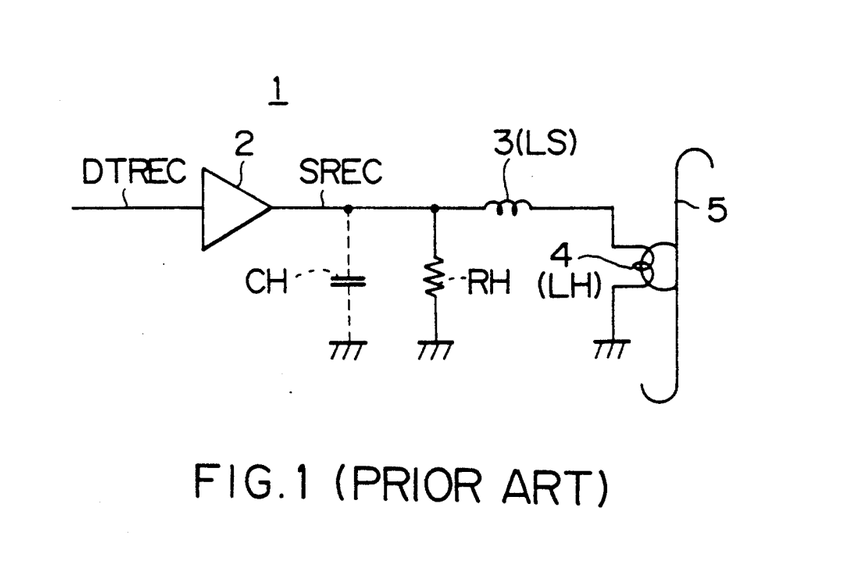
FIG. 1 is a diagram showing the conventional data recording system.

Here, the data recording system is represented by an equivalent circuit illustrated in FIG. 1.

More specifically, in this data recording system 1, information data DTREC having a predetermined transmission rate (hereinafter referred to as a data rate) is amplified in the record amplification circuit 2, and the resulting record signal SREC is fed to a magnetic head 4 through a rotary transformer 3, so that the information data DTREC is recorded on a magnetic tape 5.

Here, the inductance LS of the rotary transformer 3 represents a loss due to the rotary transformer, and the inductance LH of the magnetic head 4 represents a combined inductance of the rotary transformer 3 and the magnetic head 4. As shown by the characteristic curve in FIG. 2, a maximum frequency fmax of the record signal SREC can be recorded by such a construction.

On the output side of the record amplification circuit 2, there occurs a capacitance CH which is calculated by combining the output capacitance of the record amplification circuit 2 and the distributed capacitance of the circuits, the leads, the rotary transformer 3, etc.

In the data recording system 1, the capacitance CH and the inductances LS and LH of the rotary transformer 3 and the head 4, respectively, produce a resonance circuit, and in the frequency characteristic TO (shown by the solid line in FIG. 2), a rise occurs in the amplitude characteristic in the vicinity of the maximum frequency fmax.

Figure 2:
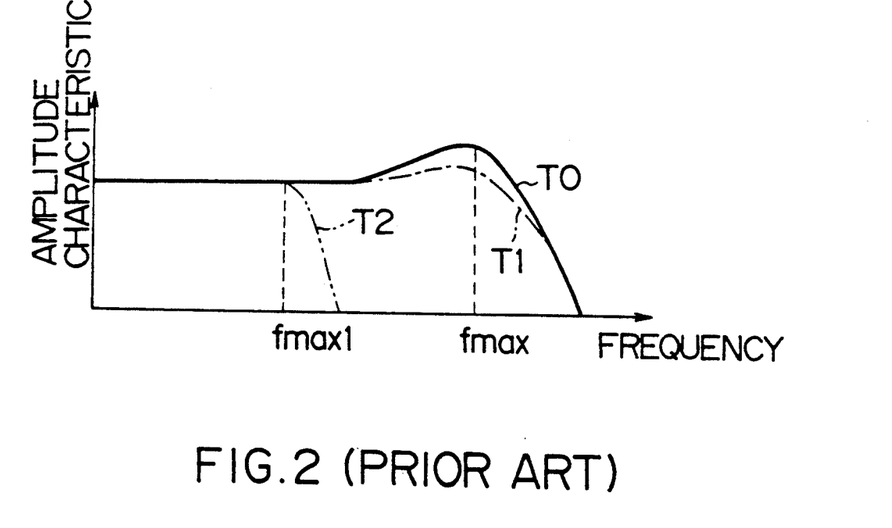
FIG. 2 is a characteristic curve graph illustrating the frequency characteristic of the apparatus shown in FIG. 1.

To correct the rise, in the data recording system 1 a damping resistor RH with one end grounded is connected to the output side of the record amplification circuit 2, and thereby the rise of the amplitude characteristic in the vicinity of the maximum frequency fmax is corrected as much as possible to provide a corrected frequency characteristic T1 (indicated by the dot-and-dash line in FIG. 2).

In the data recording system 1, information data DTREC which is typically sent at a data rate of 88 Mbps is recorded as a record signal SREC with a maximum frequency fmax of 44 MHz using magnetized patterns, which represent recording wavelength inverting at minimum intervals of 0.9 μm, formed on the recording tracks of the magnetic tape 5.

Figures 3A, 3B:
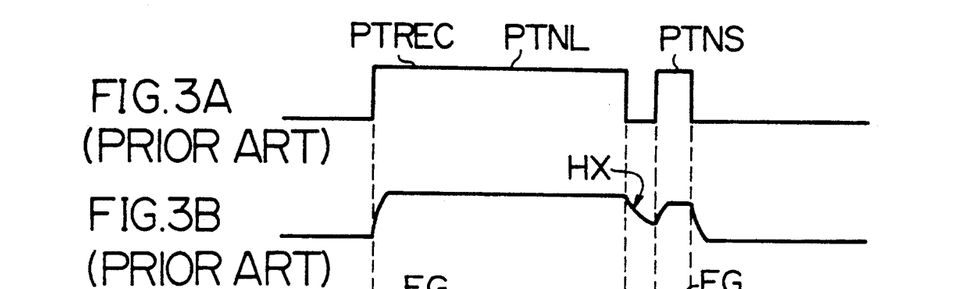
FIGS. 3A to 3C are signal waveform charts showing an ideal record signal, the effect of interference, and compensatory edge emphasis.

Here, when the information data DTREC generating a shorter wave pattern PTNS after a longer wave pattern PTNL are recorded on the magnetic tape as shown in FIG. 3A, the shorter wave pattern PTNS suffers a reduction in amplitude due to an interference wave form HX, as shown FIG. 3B.

To correct for such interference, when the information data DTREC is digitally recorded on the magnetic tape, the front edges of the record signal SREC are emphasized and/or a portion of each longer wave pattern of the record signal SREC is pulse wave modulated within the limits of a half of the minimum wavelength prior to recording.

Figure 3C:
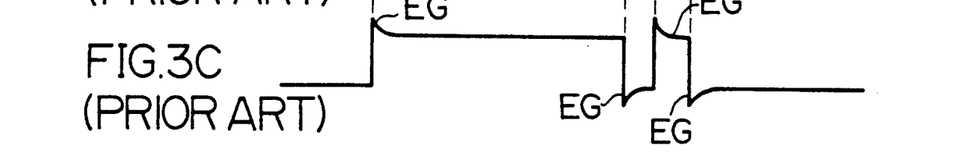

In a data recording apparatus, a front edge emphasizer (not shown in FIG. 1) is used to emphasize each front edge EG of the record signal SREC, as shown in FIG. 3C, before its is input to the record amplification circuit 2 for recording. In the data recording system 1, the relative speed of the magnetic head 4 to the recording tracks of the magnetic tape 5 can be changed by factors of 1/1 (i.e., multiplied by a factor of 1, indicating the maximum recording rate), $\frac{1}{2}$, $\frac{1}{4}$, $\frac{1}{8}$, 1/16, 1/24, etc., by controlling the rotary speed of the head 4 and the traveling speed of the magnetic tape 5, thus permitting magnetic patterns to be recorded on and reproduced from recording tracks with a minimum recording wavelength of 0.9 μm at different recording and reproducing speeds.

Figure 10:
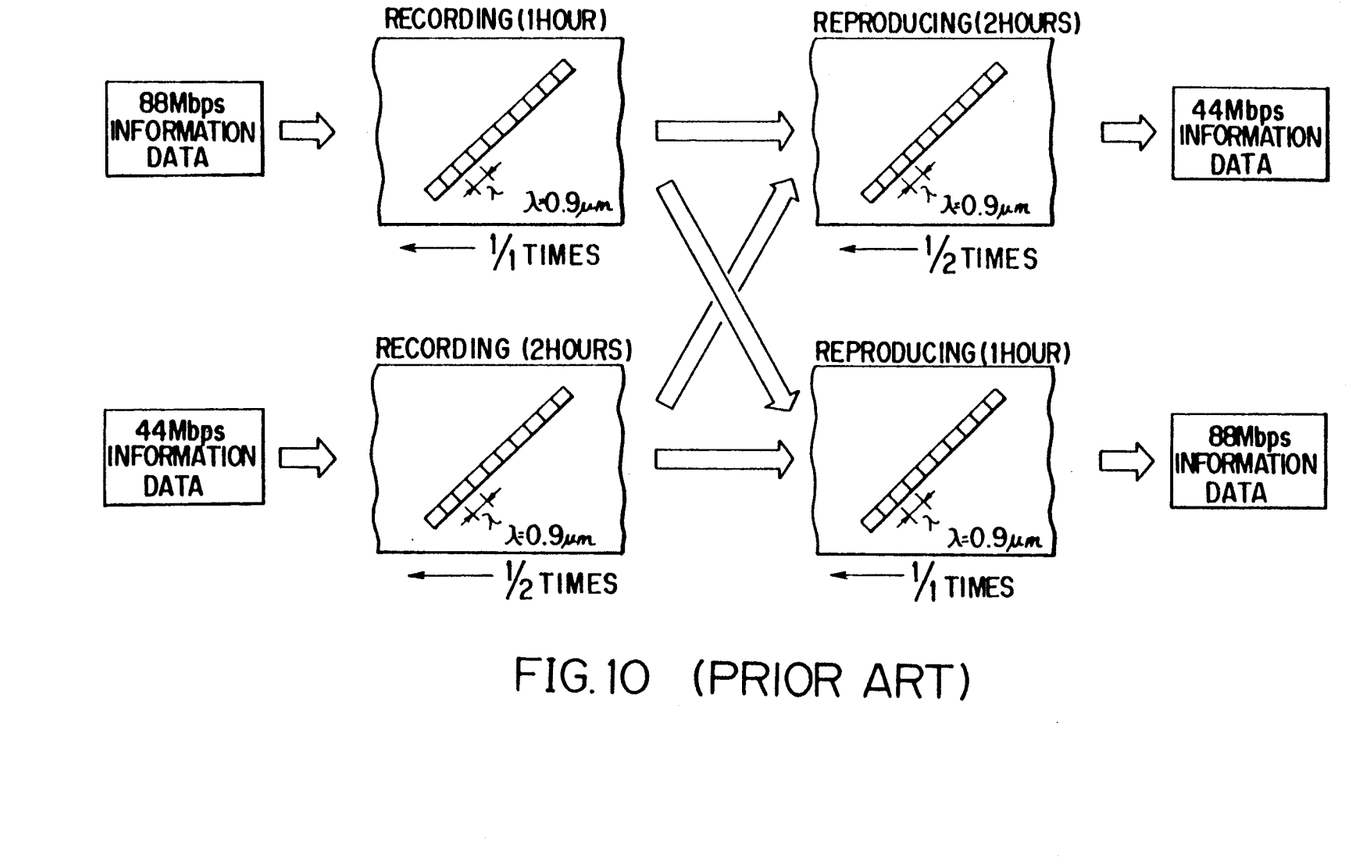
FIG. 10 is a schematic view illustrating the relationship of recording and reproducing information data.

Referring to FIG. 10, the relationship of the information data DTREC recorded on and reproduced from the recording tracks is illustrated. Information data DTREC which has been recorded at a data rate of 88 Mbps (44 MHz), for by controlling the recording speed using a factor of 1 can be read with a data rate of 44 (or 22, 11, 5.50 or 2.25) Mbps by controlling the relative speed of the magnetic tape 5 to the head 4 by a factor of $\frac{1}{2}$ (or $\frac{1}{4}$, $\frac{1}{8}$, 1/16 or 1/24); that is, a data rate with maximum frequency of 22 (or 11, 5.50, 2.25 or 1.25) MHz. This enables the information data DTREC to be reproduced at a speed which is lower by a factor of $\frac{1}{2}$ (or $\frac{1}{4}$, $\frac{1}{8}$, 1/16 or 1/24).

Furthermore information data DTREC which has been recorded at a data rate of 44 Mbps (22 MHz), for example, by controlling the recording speed using a factor of $\frac{1}{2}$ can be read with a data rate of 88 Mbps by controlling the relative reproducing speed of the magnetic tape 5 to the head 4 by a factor of 1/1; that is, a data rate with maximum frequency fmax1 of 44 MHz. This enables the information data DTREC to be reproduced at twice its recording speed.

In this data recording system, which is capable of recording and reproducing at different speeds, observed data, such as astronomical observation data, which slowly changes can be recorded at a data rate of 2.25 Mbps, and can be reproduced at a data rate of 88 Mbps. This enables data collected over a long time to be analyzed within a short time.

Furthermore, observation data, measurement data, or data for other events which quickly change may be recorded at a data rate of 88 Mbps and reproduced at a data rate of 2.25 Mbps. The enables the data to be analyzed at a lower speed. Thus, this data recording system may be used as a frequency conversion buffer for information data.

In the data recording system 1 of a conventional construction, the record signal SREC, having a maximum frequency fmax of 44 MHz, is recorded with a frequency characteristic T1 as shown by the dot-and-dash line in FIG. 2. In the case where a record signal SREC with a maximum frequency fmax of 22 MHz, for example, which is a factor of $\frac{1}{2}$ times as large as the maximum frequency fmax (44 MHz), is to be recorded, recording is carried out with an ideal frequency characteristic T2 as shown by the two-dots-and-dash line in FIG. 2.

When the frequency characteristic T1, corresponding to recording of the information data DTREC at a data rate of 88 Mbps and the frequency characteristic T2, corresponding to recording of the information data DTREC at a data rate of 44 Mbps, are different, then different magnetized patterns are recorded on the recording tracks even if the magnetized patterns are produced with a minimum recording wavelength of 0.9 μm. The difference between magnetized patterns can be observed in an eye pattern of the reproduction signal.

Figure 4A:
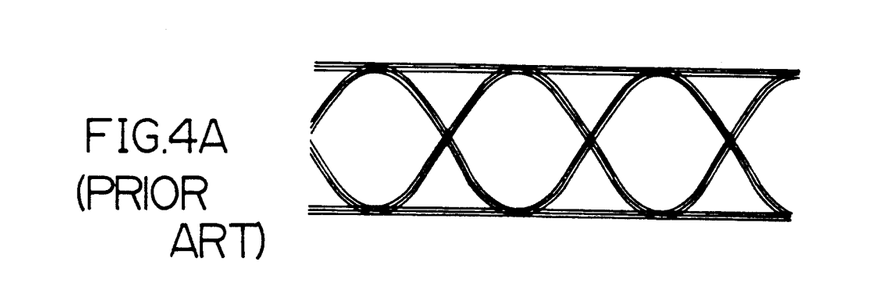
FIG. 4A and 4B are signal waveform charts showing eye patterns of a reproduction signal.
Figure 4B:
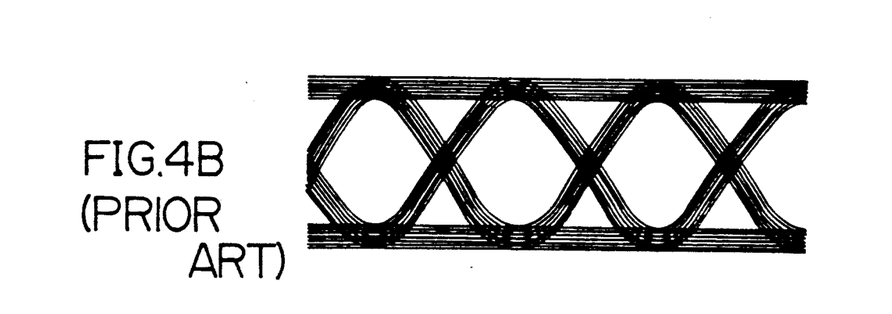

In FIG. 4A, there is illustrated an eye pattern obtained from a reproduction signal for information data recorded on a magnetic tape with a data rate of 88 Mbps at a relative speed with a factor of 1/1 and reproduced from the magnetic tape with a data rate of 88 Mbps at a relative speed with a factor of 1/1. In FIG. 4B, there is illustrated another eye pattern, obtained from a reproduction signal for information data recorded with a data rate of 44 Mbps at a relative speed with a factor of ½ on the magnetic tape and reproduced with a data rate of 88 Mbps at a relative speed with a factor of 1/1 from the magnetic tape. If the magnetized patterns formed on the magnetic tape are the same, then the eye pattern of FIG. 4A should be equal to the eye pattern of FIG. 4B. However the eye pattern of FIG. 4B is worse than the eye pattern of FIG. 4A. This means that error rates of the reproduction signals are not equal when using different data rates.

As a result, it is not possible to maintain compatibility of information data when using different data rates.

In the data recording apparatus 1, generally, a differential coefficient of the recording system and a front edge emphasizing circuit (not shown) in front of the record amplification circuit 2 are set to record the record signal SREC on the tape at data rate of 88 Mbps with a maximum frequency of 44 MHz. However, if the information data DTREC is to be recorded at a data rate of 44 Mbps or 22 Mbps, with a factor of ½ or ¼, the front edge of the information data DTREC is heavily emphasized.

Whenever emphasis of the front edges of the information data DTREC corresponds to its data rate the magnetized patterns for the various data rates are not equal, even if the magnetized patterns are formed on recording tracks with the same minimum recording wavelength. As a result, it is not possible to maintain compatibility of information data when using different data rates.

SUMMARY OF THE INVENTION

In view of the foregoing, an object of the present invention is to provide a data recording apparatus which is capable of recording substantially similar magnetized patterns on a magnetic recording medium even when recording at different data rates.

Another object of the present invention is to provide a data recording apparatus which is capable of recording information data so that its reproduction signals have substantially similar eye patterns even for different data recording rates.

An additional object of the present invention is to provide a data recording apparatus which is capable of maintaining compatibility of information data when using different data rates.

The foregoing and other objects of the present invention have been achieved providing in a data recording apparatus for recording, on a magnetic recording medium, information data supplied with one of a plurality of different data rates, and having a respective frequency characteristic, and in which a relative speed of said recording medium in respect to a magnetic head is changed according to said data rates of said information data when recording said information data on said magnetic recording medium by said magnetic head; the combination of: control means for generating a control signal according to said one data rate of said information data; and frequency characteristic processing means for processing said information data so as to selectively alter said frequency characteristic of said information data according to said control signal and thereby ensure that the processed information data are recorded on said recording medium with magnetized patterns that are substantially similar for said different data rates.

Accordingly to the present invention, the frequency characteristic of information data is, as described, altered according to its data rate, and this enables a data recording apparatus to be realized which is capable o forming substantially similar magnetic patterns on a magnetic record medium even for different data rates, and is capable of maintaining compatibility of information data between different data rates.

The nature, principle and utility of the invention will become more apparent from the following detailed description when read in conjunction with the accompanying drawings in which like parts are designated by like reference numerals or characters

DETAILED DESCRIPTION OF THE INVENTION

Preferred embodiments of this invention will now be described with reference to the accompanying drawings.

Figure 5:
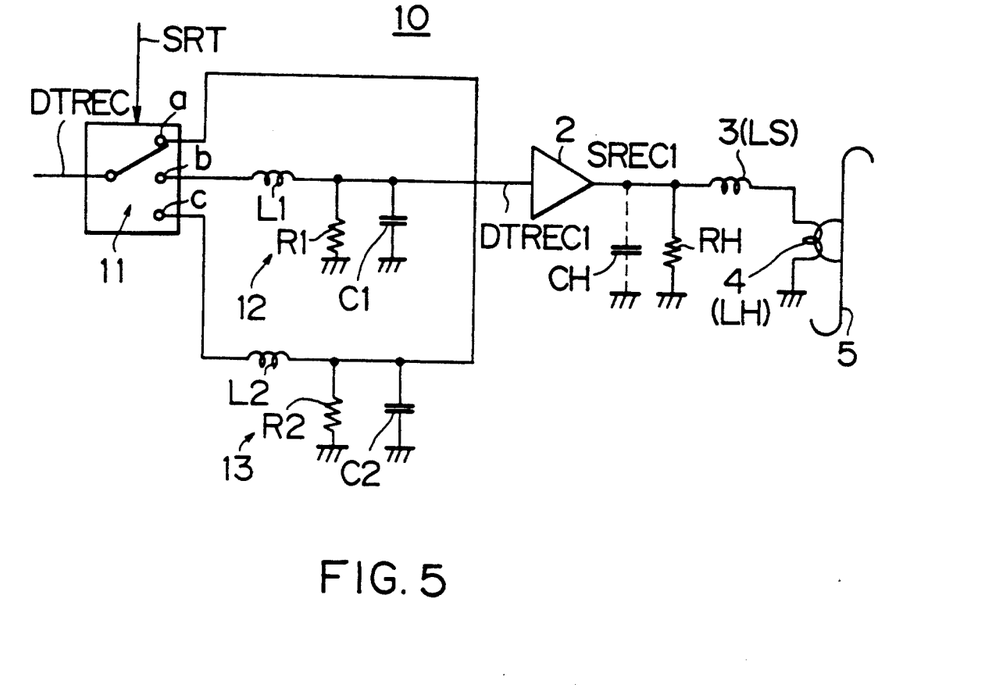
FIG. 5 is a diagram showing a first embodiment of a data recording apparatus according to the present invention.

A first embodiment of the present invention is illustrated in FIG. 5, in which parts corresponding to those of FIG. 1 are indicated by the same reference numerals, 10 generally designates a data recording apparatus, and information data DTREC is inputted to the input terminal of a switching circuit 11.

This switching circuit 11 has first, second and third output terminals a, b, and c, and is controlled to switch by a rate signal SRT which corresponds to a data rate of information data DTREC. When the first output terminal a is selected, information data DTREC is inputted as second information data DTREC1 to a record amplification circuit 2 without any change.

When the second or third output terminal b or c is instead selected, the information data DTREC undergoes frequency band limitation through a band limitation circuit 12 or 13, and is then inputted as second information data DTREC1 to the record amplification circuit 2.

The first band limitation circuit 12 consists of a coil L1, a resistor R1 and a capacitor C1. The coil L1 is interconnected in series between the second output terminal b and the record amplification circuit 2 whereas the resistor R1 and the capacitor C1 are each grounded at one end and interconnected at the other end to the connection between the coil L1 and the record amplification circuit 2.

Figure 6:
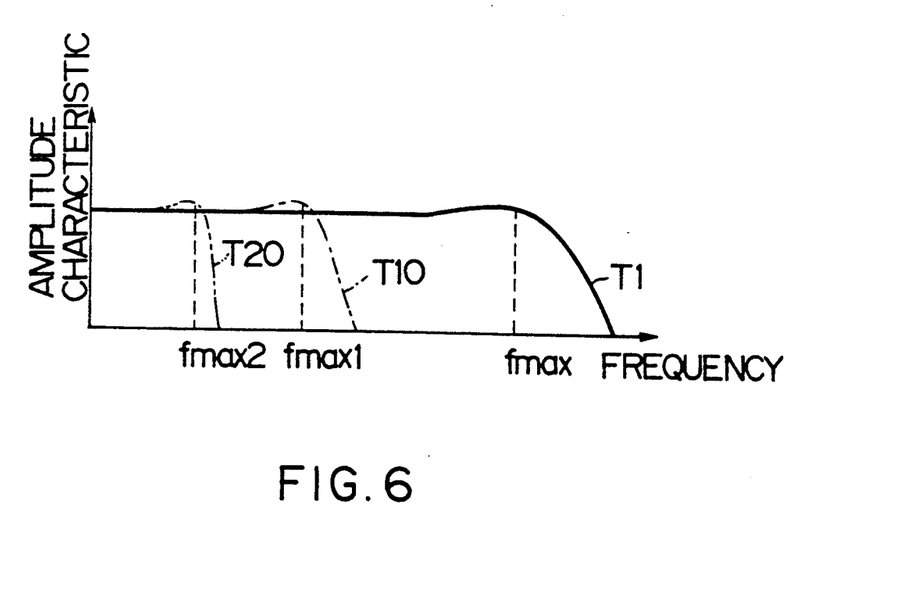
FIG. 6 is a characteristic curve graph illustrating the frequency characteristic of the apparatus shown in FIG. 5.

In practice, the values of the coil L1, the resistor R1, and the capacitor C1 are selected so that they constitute a low-pass filter which has a resonance at a maximum frequency fmax1 (e.g., 22 MHz which is a half of the maximum data recording frequency fmax (e.g. 44 MHz). As shown in FIG. 6, use of the first band limitation circuit 12 makes the apparatus have a frequency characteristic T10 (indicated by the dot-and-dash line in FIG. 6) which has a maximum frequency of about one-half of the maximum frequency of the frequency characteristic T1 (shown by the solid line in FIG. 6), which is exhibited when the first output terminal is selected.

Similarly, the second band limitation circuit 13 consists of a coil L2, a resistor R2, and a capacitor C2. The coil L2 is interconnected in series between the third output terminal c and the record amplification circuit 2 whereas the resistor R2 and the capacitor C2 are each grounded at one end and interconnected at the other end to the connection between the coil L2 and the record amplification circuit 2.

The values of the coil L2, the resistor R2 and the capacitor C2 are selected so that they constitute a low pass filter which has a resonance at a maximum frequency fmax2 (e.g., 11 MHz, the maximum frequency fmax2 being a quarter of the maximum data recording frequency fmax (44 MHz). As shown in FIG. 6, use of the second band limitation circuit 13 makes the apparatus have a frequency characteristic T20 ) indicated by the two-dots-and-dash line in FIG. 6) which has a maximum frequency of about one-quarter of the frequency characteristic T1.

With such a construction, when information data DTREC is recorded at a data rate of 88 Mbps, for example, which corresponds to the maximum frequency of the recording system, the first output terminal a of the switching circuit 11 is selected by the rate signal SRT.

This causes the information data DTREC to be amplified as second information data DTREC1 by the record amplification circuit 2 without any change, and the resulting record signal SREC of the maximum frequency fmax (44 MHz) is fed to a head 4 through a rotary transformer 3.

In this event, the relative speed of the magnetic tape 5 to the head 4 in the direction of the recording tracks is set to a factor of 1/1, and thereby magnetized patterns corresponding to the frequency characteristic T1 with a record wavelength of 0.9 μm are formed on the recording tracks of the magnetic tape 5.

When information data DTREC is recorded at a data rate of 44 Mbps, which is a half of the data rate of 88 Mbps, the second output terminal b of the switch circuit 11 is selected by the rate signal SRT.

This causes the information data DTREC to undergo frequency band limitation in the first band limitation circuit 12 according to the frequency characteristic T10, and then amplification as second information data DTREC1 in the record maximum frequency fmaxl (22 MHz) is supplied to the head 4 through the rotary transformer 3.

In this event, the relative speed of the magnetic tape 5 to the head 4 in the direction of the recording tracks is set to a factor of ½, and thereby magnetic patterns corresponding to the frequency characteristic T10 with a record wavelength of 0.9 μm are formed on the re- cording tracks of the magnetic tape 5.

When information data DTREC is recorded at a data rate of 22 Mbps, which is one quarter of the data rate of 88 Mbps, the third output terminal c of the switching circuit 11 is selected by the rate signal SRT.

This causes the information data DTREC to undergo frequency band limitation in the second band limitation circuit 13 according to the frequency characteristic T20, and then amplification as second information data DTREC1 in the record amplification circuit 2. The resulting record signal SREC with maximum frequency fmax2 11 MHz is supplied to the head 4 through the rotary transformer 3.

In this event, the relative speed of the magnetic tape 5 to the head 4 in the direction of the record track is set to a factor of ¼, and thereby magnetized patterns corresponding to the frequency characteristic T20 with a record wavelength of 0.9 μm are formed on the recording tracks of the magnetic tape 5.

In the data recording apparatus 10, the switching of the switching circuit 11 is controlled by the rate signal SRT according to the data rate of the information data DTREC, and thereby the band limitation of the information data DTREC is selected according to the data rate, selectively using the band limitation circuits 12 or 13.

Even when recording at different speeds, magnetized patterns with substantially similar frequency characteristics are consequently produced on recording tracks of the magnetic tape 5.

In the foregoing construction, the band limitation of information data is limited by the selective use of the band limiting circuits according to the data rate of the information data, and so a data recording system which is capable of producing substantially similar magnetized patterns on a magnetic tape even when recording at different data rates can be realized.

In the first embodiment, there are provided band limitation circuits which are used for recording ½ and ¼ of the maximum data rate of information data, respectively. However, in addition to these, band limitation circuits which are used for recording ⅛, 1/16 and 1/24 of the maximum data rate may be provided and this enables similar effects to those of the embodiment previously described to be provided even for different data rates; 1, ½, ¼, ⅛, 1/16, and 1/24 of the maximum data rate.

When selectively recording information data at different data rates variable components be used for coils resistors and capacitors of the band limitation circuits for controlling the values of these components to correspond to different data rates, instead of the construction where band limitation circuits with fixed rates are switch controlled. This considerably simplifies the overall configuration.

Figure 7:
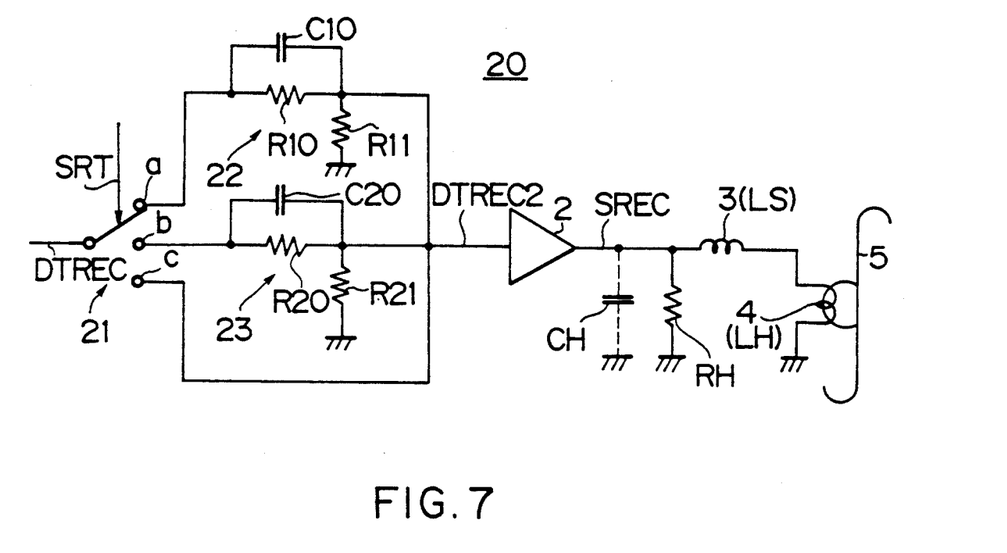
FIG. 7 is a diagram showing a second embodiment of a data recording apparatus according to the present invention.

A second embodiment of the present invention is illustrated in FIG. 7, in which parts corresponding to those of FIG. 5 are indicated by the same reference numerals, 20 generally designates a data recording apparatus, and information data DTREC is inputted to the input terminal of a switching circuit 21.

This switching circuit 21 has first, second and third output terminals a, b and c, and is controlled to switch by a rate signal SRT which corresponds to a data rate of information data DTREC. When third output terminal c is selected, the information data DTREC is inputted as third information data DTREC2 to recording amplification circuit 2 without any change.

When a first or second output terminal a or b is selected, each front edge of the information data signal is emphasized by a predetermined amount through a first or second front edge emphasizing circuit 22 or 23, and is then inputted as third information data DTREC2 to the recording amplification circuit 2.

The first front edge emphasizing circuit 22 consists of a differential circuit, a resistor R10 and a capacitor C10 connected in parallel to each other, then connected in series between the first output terminal a and the record amplification circuit 2, and a resistor R11 grounded at one end and connected at its other end to the connection between the resistor R10 and the record amplification circuit 2.

The values of the resistors R10, R11 and the capacitor C10 are selected so that a differential coefficient suitable for emphasizing a front edge of information data recorded at data rate of 88 Mbps (i.e., with maximum frequency fmax of 44 MHz is generated.

Similarly, the second front edge emphasizing circuit 23 generally consists of a differential circuit, a resistor R20 and a capacitor C20 connected in parallel to each other, then connected in series between the second output terminal b and the record amplification circuit 2, and a resistor R21 grounded at one end and connected at its other end to the connection between the resistor R20 and the record amplification circuit 2

The values of the resistors R20, R21 and the capacitor C20 are selected so that a differential coefficient suitable for emphasizing a front edge of information data recorded at data rate of 44 Mbps (i.e., with maximum frequency fmax of 22 MHz is generated.

From experience, it is confirmed that an interference wave form HX (shown in FIG. 3B) is generated when the information data DTREC digitally recorded on a magnetic tape 5 are related to a magnetic inductivity μ of the magnetic head 4 and a magnetic characteristic of the magnetic tape 5 used as a recording medium, and the higher the magnetic inductivity of magnetic head is, the smaller the interference between wave forms is, in the cases where the magnetic tapes used are the same.

Figure 8:
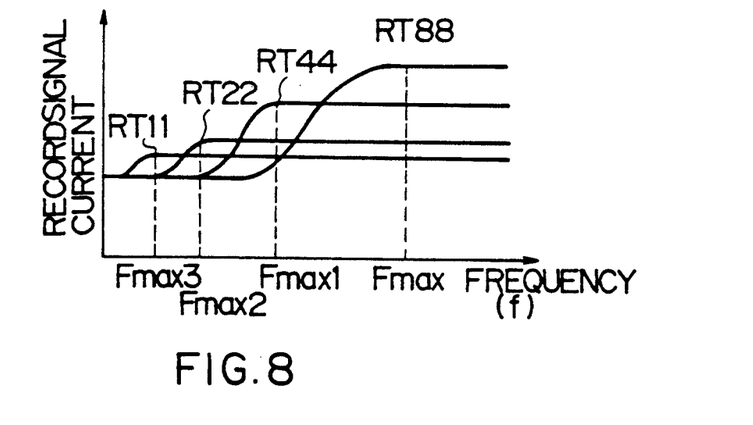
FIG. 8 is a characteristic curve graph illustrating the frequency characteristic of the apparatus shown in FIG. 7.

Experience also confirms that the magnetic inductivity μ has a frequency characteristic as illustrated by graphs RT88, RT44, RT22 and RT11 in FIG. 8 corresponding to data rates of 88, 44, 22 and 11 Mbps.

Therefore the lower the frequency of the recording signal SREC provided to the magnetic head 4, the smaller the interference between wave forms is, so in cases where the magnetic tape 5 and the magnetic head 4 used are the same, the amount of emphasizing for the front edges of the information data signal may be smaller for a signal of lower frequency.

On the basis of this principle, in the data recording apparatus of this second embodiment, first and second front edge emphasizing circuits emphasize the front edge of the signal of the information data DTREC with different amounts of emphasizing at data rates of 88 and 44 Mbps, and when the data rate of the information data DTREC is 88 or 44 Mbps, each front edge of the signal of the information data DTREC is emphasized through the first or second front edge emphasizing circuit and the emphasized signal is inputted to recording amplification circuit 2.

When the data rate of the information data DTREC is lower than 22 Mbps, the signal of the information data DTREC is inputted to the record amplification circuit without any emphasizing of its front edges.

With this construction, when the formation data DTREC is recorded at a data rate of 88 Mbps, for example, the first output terminal a of the switching circuit 11 is selected by a rate signal SRT.

Selection of terminal a causes the front edges of the information signal to be emphasized in the first front edge emphasizing circuit 22, then the signal is amplified by the record amplification circuit 2 as third information data DTREC2, and the resulting record signal SREC of the maximum frequency fmax (44 MHz) is fed to a head 4 through a rotary transformer 3.

In this event, the relative speed of the magnetic tape 5 to the head 4 in the direction of the recording tracks is set to a factor 1/1, and thereby magnetized patterns with a minimum recording wavelength of 0.9 μm are formed on the recording tracks of the magnetic tape 5.

When the information data DTREC is recorded at a data rate of 44 Mbps, the second output terminal b of the switching circuit 21 is selected by the rate signal SRT.

Selection of terminal b causes the front edges of the signal of the information data DTREC to be emphasized in second front edge emphasizing circuit 23, then the signal is amplified as third information data DTREC2 by the record amplification circuit 2, and the resulting record signal SRCE with the maximum frequency fmax1 of 22 MHz is fed to the head 4 through the rotary transformer 3.

In this event, the relative speed of the magnetic tape 5 to the head 4 in the direction of the recording tracks is set to a factor of ½, and thereby magnetized patterns with the minimum recording wavelength of 0.9 μm are formed on the recording tracks of the magnetic tape 5.

When the information data DTREC is recorded at a data rate of 22 Mbps, the third output terminal c of the switching circuit 21 is selected by the rate signal SRT.

Selection of terminal c causes the information data DTREC to be amplified as the third information data DTREC2 in the record amplification circuit 2, then the resulting record signal SREC with the maximum frequency fmax2 or 11 MHz is fed to the head 4 through the rotary transformer 3.

In this event, the relative speed of the magnetic tape 5 to the head 4 in the direction of the recording tracks is set to a factor of ¼, and thereby magnetized patterns with the minimum recording wavelength of 0.9 μm are formed on the recording tracks of the magnetic tape 5.

In the foregoing construction, the front edge of the signal of the information data DTREC is emphasized through selective use of the front edge emphasizing circuit by the rate signal according to the data rate of the information data, with the amount of emphasizing according to the data rate, and so a data recording system which is capable of producing substantially similar magnetized patterns on a magnetic tape even when recording at different data rates can be realized.

Figure 9:
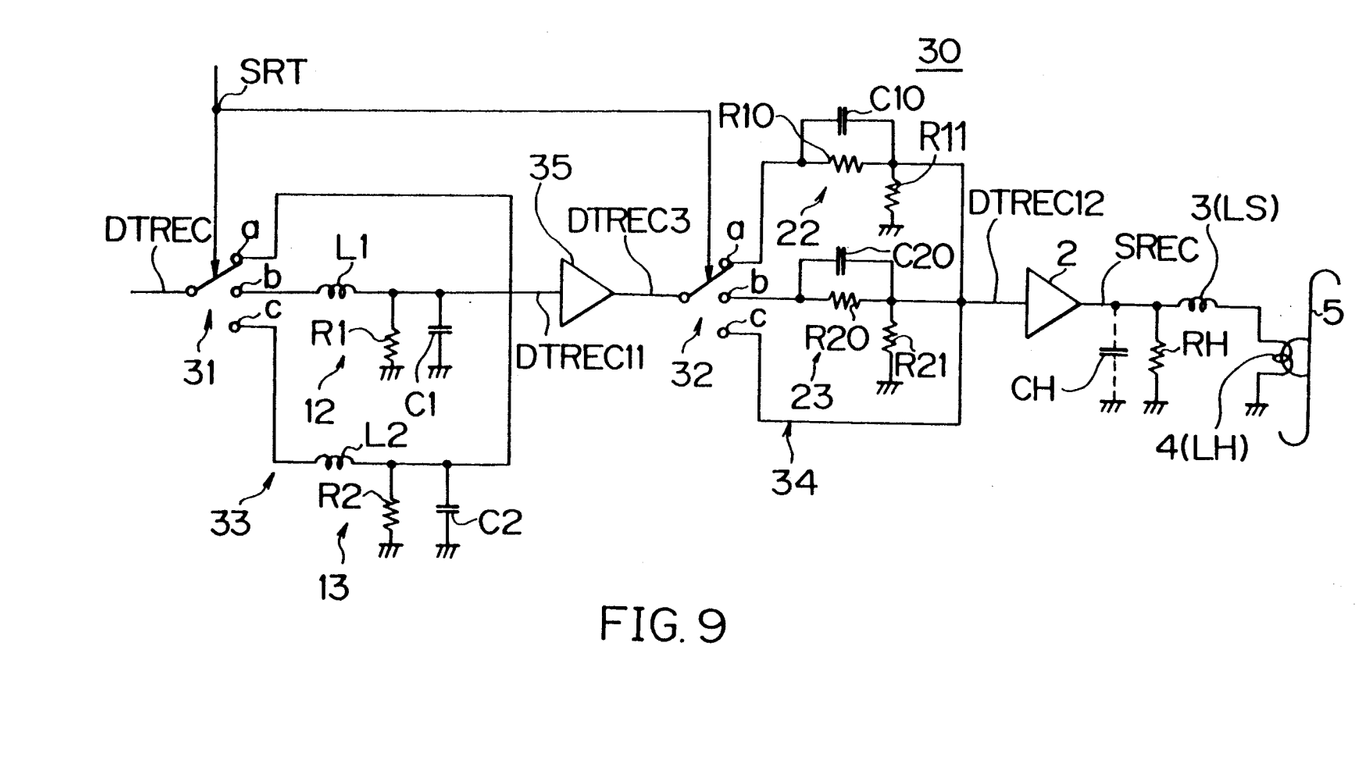
FIG. 9 is a diagram showing a third embodiment of a data recording apparatus according to the present invention.

A third embodiment of the present invention is illustrated in FIG. 9, in which parts corresponding to those of FIGS. 5 and 7 are indicated by the same reference numerals, 30 generally designates a data recording apparatus, and this circuit construction is essentially a circuit construction in which the edge emphasizing circuit of the second embodiment is connected in series to the band limitation circuit portion of the first embodiment. Switching circuits 31 and 32 are controlled by a rate signal SRT according to the data rate of the information data DTREC so as to switch among their respective output terminals a, b and c synchronously. The operations of a band limitation circuit portion 33 and an edge emphasizing circuit portion 34 controlled by the rate signal SRT are identical with the corresponding operations described above for the first and second embodiments, respectively.

The signal of the information data DTREC is band limited in the band limitation circuit portion 33 according to its data rate, then fed to a buffer amplification circuit 35 as the information data DTREC11.

The band limited information data DTREC11 is output from the buffer amplification circuit 35 as data DTREC3, then is edge emphasized in the edge emphasizing circuit portion 34 according to its data rate, then is fed to the record amplification circuit 2 as information data DTREC12. This circuit construction causes the magnetized patterns formed on the magnetic tape to be substantially similar to each other at least as effectively as the first and second embodiments previously described even when recording at different data rates.

Although with regard to FIG. 10 it is stated that this data recording system may be used to record observation data and measurement data, for example, the present invention is suitably applied to various data recording systems which are capable of recording video signals and audio signals on magnetic tapes, magnetic disks, etc. provided they are capable of recording information data at different speeds.

Although in the second embodiment, there are provided front edge emphasizing circuits which are comprised of a differential circuit and emphasize the front edge of the signal of the information data, that is, signal components of higher frequencies, the present invention is not limited to this. The signal components with higher frequencies may be emphasized by a different circuit, for example, a digital filter. In this event, digital filters with different frequency characteristics may be used according to the data rate.

In the second embodiment, there are provided front edge emphasizing circuits, which are used for 1/1 and 1/2 times the maximum data recording rates, respectively. However, in addition to those, front edge emphasizing circuits which are used for 1/4, 1/8, 1/16, or 1/24 of the maximum data recording rates, respectively, may be provided, and this enables similar effects to those of the embodiment previously described to be provided even for different data recording rates: 1/4, 1/8, 1/16 or 1/24 of the maximum.

When selectively altering a frequency characteristic of information data supplied with one of a plurality of data rates, variable value components may be used for resistors and capacitors of the front edge emphasizing circuits to control the values of these components to correspond with the data rate instead of a construction in which several front edge emphasizing circuits with fixed constants are selected by a switch. This considerably simplifies the overall configuration.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. In a data recording apparatus for recording, on a magnetic recording medium, information data supplied with one of a plurality of different data rates, and having a respective frequency characteristic, and in which a relative speed of said recording medium in respect to a magnetic head is changed according to said data rates of said information data when recording said information data on said magnetic recording medium by said magnetic head; the combination of:

control means for generating a control signal according to said one data rate of said information data; and frequency characteristic processing means for processing said information data so as to selectively alter said frequency characteristic of said information data according to said control signal and thereby ensure that the processed information data are recorded on said recording medium with magnetized patterns that are substantially similar for said different data rates.

2. An apparatus for data recording according to claim 1, in which said frequency characteristic processing means comprises frequency band limitation means for limiting a frequency band of said information data according to said control signal.

3. An apparatus for data recording according to claim 1, in which said frequency characteristic processing means comprises higher frequency emphasizing means for emphasizing higher frequency signal components, when recording said information data, according to said control signal, in which the larger that said one data rate of said information data is, the larger is the emphasizing.

4. An apparatus for data recording according to claim 3, in which said higher frequency emphasizing means consists of an edge emphasizing circuit in which emphasizing is by a differential circuit.

5. An apparatus for data recording according to claim 3, in which said frequency characteristic processing means further includes frequency band limitation means for limiting a frequency band of said information data according to said control signal.

* * * * *